Figure 1:
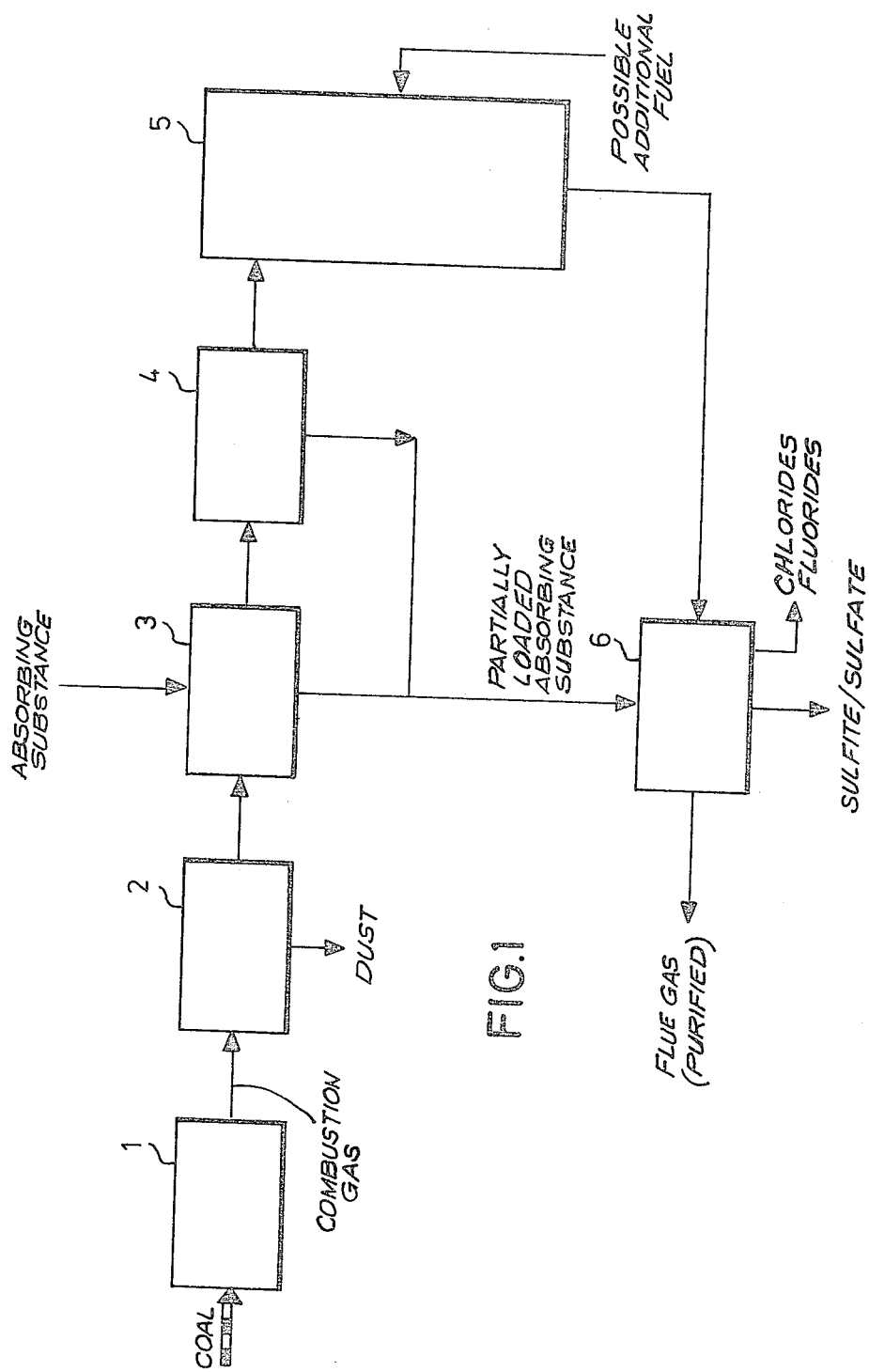

United States Patent [19]

Poller et al.

[11] Patent Number: 4,472,363
[45] Date of Patent: Sep. 18, 1984

[54] PROCESS FOR THE SEPARATION OF CHLORINE, FLUORINE AND SULPHUR FROM FUEL GAS AND FLUE OR EXHAUST GAS

[75] Inventors: Jürgen Poller, Holzwickede; Klaus Weinzierl, Dortmund, both of Fed. Rep. of Germany

[73] Assignee: Vereinigte Elektrizitätswerke Westfalen AG, Dortmund, Fed. Rep. of Germany

[21] Appl. No.: 420,621

[22] Filed: Sep. 21, 1982

[30] Foreign Application Priority Data

Sep. 23, 1981 [DE] Fed. Rep. of Germany ....... 3137812

[51] Int. Cl.$^3$ .................. C01B 7/00; C01B 17/00; B01J 8/00; C10J 3/00
[52] U.S. Cl. ................................ 423/240; 423/230; 423/241; 423/244; 48/197 R
[58] Field of Search .......... 423/242 A, 242 R, 244 A, 423/244 R, 240 S, 240 R, 241, 230; 110/343, 345; 48/197 R

[56] References Cited

U.S. PATENT DOCUMENTS 3,386,798 6/1968 Bevans ............................... 423/242
3,520,649 7/1970 Tomany et al. ..................... 423/242
4,302,218 11/1981 Friedman ........................... 423/244

FOREIGN PATENT DOCUMENTS 1429427 3/1976 United Kingdom ............... 423/241
2010793 7/1979 United Kingdom ............... 423/244

Primary Examiner—Gregory A. Heller
Attorney, Agent, or Firm—Toren, McGeady and Stanger

[57] ABSTRACT

Fuel gas produced in a coal distillation or gasification plant 1 is fed to a power plant 5 and chlorine, fluorine, sulphur and compounds thereof in the fuel gas are separated from the fuel gas, and also from flue or exhaust gas emanating from the power plant, in two stages. In a first stage, chlorine and fluorine and their compounds are separated, preferably in the dry using alkali metal or alkaline earth metal oxides, hydroxides or carbonates, in a separator 3. In a second stage sulphur and its compounds, together with further chlorine, fluorine and their compounds, if any, produced in the power plant, are removed from the flue or exhaust gas from the power plant in a desulphurizing plant 6. This two stage process is thermally more efficient and less costly than a process in which the chlorine, fluorine sulphur and their compounds are all removed at once from the fuel gas.

5 Claims, 2 Drawing Figures

PROCESS FOR THE SEPARATION OF CHLORINE, FLUORINE AND SULPHUR FROM FUEL GAS AND FLUE OR EXHAUST GAS

This invention relates to a process for the separation of chlorine, fluorine and sulphur and compounds thereof from fuel gas produced from a coal distillation or gasification plant and from flue or exhaust gas issuing from power plant in which the fuel gas, which may also include some coke from the distillation or gasification plant, is used.

Coal distillation and gasification supplies gaseous fuel for public supply networks, as feedstock for the chemical industry, instead of natural gas, or for the generation of electricity in power plants.

For reasons of emission limitation, the risk of corrosion of plant components, and in the light of the risk of poisoning, the fuel gas produced in coal distillation and gasification must be cleansed, for example before it is fed into the public supply network, from harmful components which can pollute the environment. The harmful components resulting from the nature of coal arise either as dust or in gaseous form as sulphur, chlorine, fluorine and their compounds. Furthermore, in the gasification process, other gas components such as HCN and $NH_3$ arise, which likewise must be separated. If the gas is used for synthesis purposes in the chemical industry, purification to very low residual values of the harmful substance compounds is necessary.

Whereas, therefore, the use of the fuel gas for the public supply network or as feedstock in the chemical industry renders necessary a complete separation of all impurities, this is not absolutely necessary where the gas is used in power plant operation, with the exception of dust separation, in the light of the emission regulations, if these impurities are subsequently removed by purification of the flue or exhaust gas from the power plant.

The use of the fuel gas in power plants having gas turbines is especially advantageous. If gas turbines are used in a so-called combined process in conjunction with steam turbines supplied by boilers, the thermodynamic efficiency can be appreciably increased since the gas turbines operate at a considerably higher burnt fuel gas temperature than that required for heating the boilers.

The present invention is based on the consideration that it is necessary, in the light of the increasing scarcity and cost of fuels, to make the overall efficiency of power plants as high as possible. It is therefore of importance to optimize every process step from the treatment of the fuel to the purification of the fuel gas and the flue or exhaust gas, taking into account the emission regulations, the disposal of the wastes and effluents arising in power plant operation, and the life and susceptibility to repair of the individual plant components.

The object of the present invention accordingly is to provide a process as initially described which operates both technically for the plant and also in the energy balance at a minimum expenditure, enables energy losses to be reduced, avoids damage at the gas turbines and other power plant components due to corrosive impurities in the fuel gas and, with optimum utilization of an absorption agent required for the separation of the impurities from the fuel gas, and turns the impurities into industrially usable compounds.

To this end, according to this invention, in a process as initially described, the chlorine and fluorine and compounds thereof are separated from the fuel gas before its use in the power plant operation, and the sulphur and its compounds, together with further chlorine, fluorine and compounds thereof, if any, produced in the power plant operation, are separated from flue or exhaust gas of the power plant.

Preferably, the chlorine, fluorine and compounds thereof are dry separated.

With this process, the chlorine and fluorine compounds which attack gas turbine blades which may be present in the power plant, and therefore reduce their working life, are removed at comparatively low expenditure from the fuel gas, whereas the sulphur and its compounds, which scarcely or not at all adversely influence the life of the power plant components, are separated only at the end of the power plant operation in a conventional flue gas desulphurization plant.

Although two gas purifications are necessary, one for the selective separation of chlorides and fluorides from the fuel gas and one for the separation of sulphur and sulphur compounds from the flue or exhaust gas, the total cost of the separation is lower and is associated with lower losses than when all the impurities are separated before the use of the fuel gas in the power plant operation. The total purification of the fuel gas is very expensive, since apart from the already mentioned gas constituents, nitrogen compounds such as HCN and $NH_3$, which arise in the distillation and gasification of coal, must also be removed, because they contaminate the usual absorption agents used in the gas purification processes. In the dry separation of chlorides and fluorides, these constituents can remain in the gas, because they are oxidized in the combustion chamber of the gas turbine to harmless compounds.

Total purification of the fuel gas can furthermore be determining for the load behaviour of the entire plant, with the result that the flexibility and adaptability of the power plant to the power demand is reduced.

In an advantageous process variant, chloride and fluoride compounds resulting from the chlorine and fluorine separation from the fuel gas together with coke dust from the coal distillation or gasification plant are supplied to the furnace of a steam boiler in the power plant.

When this is done, only one dust filter is required. The chlorides and fluorides return to the gaseous phase in the furnace of the steam boiler and are finally removed in the flue gas desulphurization. The chlorides and fluorides in this case also do not attack the gas turbine blades, and any further acid gas constituents which may be contained in the gas from the gas production process and feedstock and which react with the absorption agent used in the separation of the chlorides and fluorides can be oxidized in the furnace in an environmentarily favourable manner.

If the separation of the chlorine, fluorine and their compounds from the fuel gas takes place in a dry process, an increase in the efficiency of the plant is associated therewith, because following on the waste heat utilization of the sensible heat produced in the coal distillation or gasification at high temperature level downstream of the gas generator, the heat produced at a low temperature level can also be exploited, because the fuel gas can be supplied to a gas turbine of the power plant at a comparatively high temperature level.

Advantageously, the chlorides and fluorides are dry separated at high temperature by treating the fuel gas with alkali metal and/or alkaline earth metal oxides or hydroxides or carbonates. The alkali metals or alkaline earth metals combine with the chlorine and the fluorine and form corresponding chlorides and fluorides, while according to the type of the charge material or feedstock, water and carbon dioxide are cracked. The dry alkali metal or alkaline earth metal chlorides and fluorides are filtered out from the fuel gas together with an excess of absorption agent.

In this dry process, the production of waste water, which would take place in wet processes, for example in gas washing due to the temperature falling below the water vapour dewpoint due to the necessary low temperature, is avoided. Such a condensate would contain, in addition to chlorides and fluorides, also other harmful substances, such as ammonia and cyanide compounds.

Instead of storing the alkali metal and alkaline earth metal chlorides and fluorides together with the excess absorption agent in waste dumps, as has hitherto been usual, the total filtered-out substance mixture can be fed to the flue or exhaust gas desulphurization treatment and the still unconsumed proportion of the alkali metal and alkaline earth metals may be used in this treatment for separating the sulphur compounds. The chlorides and fluorides contained in the filtered-out substance mixture pass through the flue gas desulphurization treatment only as ballast material, without participating in the desulphurising reactions. They can be removed in a small quantity of waste water, which can be concentrated by evaporation without difficulty and with an economically acceptable energy consumption. In this manner, even in a conventional coal-fired power station with flue gas desulphurization, the chlorides and fluorides introduced with the coal can be removed from the circuit of the flue gas desulphurization.

In the selective separation of the chlorides and fluorides from the fuel gas, the absorbtion agent does not need to be fully utilized and thus does not need to be added stoichiometrically. Since the stoichiometric quantity of absorption agent for the separation of the sulphur dioxide in the flue gas desulphurization amounts to many times that required for separating the chlorides and fluorides, it is ensured that the excess quantity of absorption agent from the chloride and fluoride separation is fully utilized in the flue gas desulphurization. This permits operation of the chloride and fluoride separation with almost any excess of absorption agent.

Figure 2:
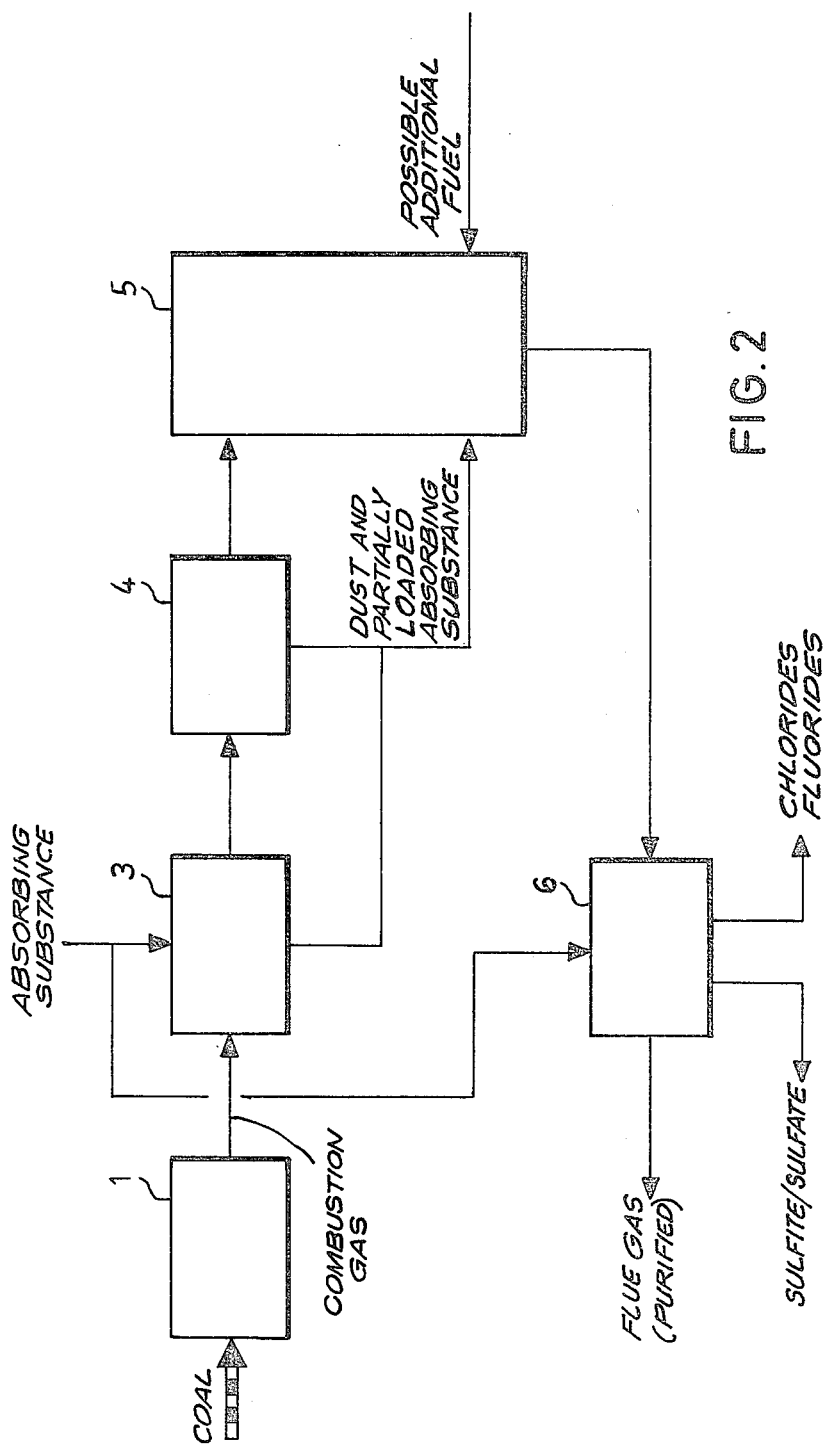

Two examples of processes in accordance with the invention will now be described with reference to the accompanying drawings in which:

FIG. 1 is a block diagram showing the components of a plant for carrying out one example of the process; and FIG. 2 is a similar diagram of a different plant for carrying out a second example of the process.

In a coal distillation or gasification plant 1 with waste heat utilization, fuel gas is produced. This fuel gas is initially still charged with gaseous impurities or harmful substances including chlorine, fluorine and sulphur compounds and also dust, and sometimes also coke. The entrained dust is first separated from the fuel gas in a dust separator 2, then the fuel gas passes into a plant 3 for the selective separation of chlorides and fluorides by means of alkali metal and/or alkaline earth metal oxides or hydroxides and/or carbonates, preferably calcium oxide and calcium carbonate. The resultant calcium chloride and calcium fluoride is supplied, together with excess alkali metal or alkaline earth metal oxides or carbonates from the plant 3 directly to a flue gas desulphurization plant 6. In order, however, to remove from the fuel gas any dust particles that may be entrained, a filter 4 is connected downstream in the fuel gas path of the plant 3. The filter 4 supplies the collected dust also directly to the flue gas desulphurization plant 6.

From the filter 4 the fuel gas passes to a power plant 5, which preferably operates according to the so-called combined process, in which the fuel gas or a portion of the fuel gas is initially fed to a gas turbine and is burnt with a high excess of air. The exhaust gases from the gas tubine contain sufficient oxygen to be supplied directly to the combustion chamber of a steam boiler plant, where the remainder of the fuel gas is burnt together with the gas turbine exhaust gases. Additional solid, liquid or gaseous fuel may also be supplied to the steam boiler. The flue or exhaust gases produced in the power plant 5 are fed to the flue gas desulphurization plant 6, where the gas is desulphurized in the usual manner, but owing to the mixture of substances fed from the plant components 3 and 4 and comprising alkali metal or alkaline earth metal chlorides and fluorides and the excess absorption agent consisting of alkali metal or alkaline earth metal oxides or carbonates and, if necessary, additional absorption agents as well.

In the process according to FIG. 2, dry absorption agent charged with chlorides and fluorides and also dust from the coal distillation or gasification plant 1, is separated from the fuel gas in the separator plant 3 and the filter 4 connected downstream of it. The resultant mixture of alkali metal or alkaline earth metal chlorides and fluorides, the excess absorption agent and the simultaneously separated dust which usually still contains substantial fractions of unreacted carbon as coke dust, is fed to the furnace of a steam boiler in the power plant 5, where the combustible constituents of the mixture are reacted and the absorption agent which is charged with harmful substances, is thermally cracked. The chlorides and fluorides separated from the fuel gas are then entrained in the flue gas of the power plant 5 and are removed together with the sulphur dioxide in the flue gas desulphurization plant 6. The advantage of this procedure consists in the saving of one separation unit and also the oxidation of compounds of the absorption agent with other harmful substances in the fuel gas. These substances are produced particularly when, owing to the type of process for coal distillation or gasification, the fuel gas is charged with considerable quantities of nitrogen compounds such as HCN and NH$_3$ or other harmful substances, which react to form compounds with the absorption agent and can have an adverse effect upon the operation of the flue gas desulphurization plant and upon the end product recovered therein. The oxidation of such undesired gas impurities in the furnace of the steam boiler is an environmetally favourable solution to the problem of their disposal.

The process in accordance with this invention is distinguished by the advantage that, using conventional techniques and conventional plants for the coal distillation or gasification, for the chloride and fluoride separation, for the power plant operation and for the flue gas desulphurization, an optimized process is obtained which, in spite of low expenditure, is characterized by a high overall efficiency and by the provision of industrially exploitable waste products.

We claim:

1. A process where combustible gas from a coal degasification plant or gasification plant is used to power a turbine power plant, said combustible gas containing coke dust, chlorine, fluorine, sulfur, or compounds thereof, said process comprising separating the chlorine, fluorine, and compounds thereof from the combustible gas prior to its use in the power plant in a dry separation process, said dry separation process employing an absorption agent selected from the group consisting of alkali metal or alkaline earth metal oxides, hydroxides, and mixtures thereof and alkali metal and alkaline earth metal carbonates and removing the sulfur and compounds thereof and remaining chlorine, fluorine and compounds thereof from the flue gas after it issues from the power plant 2. The process of claim 1 further comprising the step of supplying alkali metal and alkaline earth metal chloride and fluoride resulting from said dry separation process together with an excess of said absorption agent to said step of separating said sulphur and compounds thereof from the flue gas from the power plant.

3. The process of claim 2 in which said excess of said absorption agent is converted in said step of separating said sulphur and compounds thereof from said flue gas into a compound selected from the group consisting of alkali metal or alkaline earth metal sulphites and alkaline earth metal sulphates.

4. The process of claim 1 wherein coke obtained from the gasification plant is also used in the power plant.

5. The process of claim 1 in which said power plant includes a steam boiler having a furnace and wherein the separated chlorine and fluorine compounds and coke dust are supplied to the furnace.

* * * * *